(12) United States Patent
Swinson et al.

(10) Patent No.: US 9,747,620 B2
(45) Date of Patent: Aug. 29, 2017

(54) SYSTEMS AND METHODS FOR DETERMINING THE TIME TO BUY OR SELL A VEHICLE

(71) Applicant: TrueCar, Inc., Santa Monica, CA (US)

(72) Inventors: Michael D. Swinson, Santa Monica, CA (US); Joel Martin Lander, Santa Monica, CA (US)

(73) Assignee: TrueCar, Inc., Santa Monica, CA (US)

( * ) Notice: Subject to any disclaimer, the term of this patent is extended or adjusted under 35 U.S.C. 154(b) by 604 days.

(21) Appl. No.: 14/136,687

(22) Filed: Dec. 20, 2013

(65) Prior Publication Data

US 2014/0279708 A1    Sep. 18, 2014

Related U.S. Application Data

(60) Provisional application No. 61/780,749, filed on Mar. 13, 2013.

(51) Int. Cl.
*G06F 7/00* (2006.01)
*G06Q 30/02* (2012.01)

(52) U.S. Cl.
CPC ................ *G06Q 30/0283* (2013.01)

(58) Field of Classification Search
CPC .... G06Q 30/02; G06Q 10/06; G06Q 30/0203; G06Q 30/0278; G06Q 30/0283; G06Q 30/06; G06Q 20/201; G06Q 30/0201; H02J 2003/146
USPC .................... 235/376, 375, 383, 380, 381
See application file for complete search history.

(56) References Cited

U.S. PATENT DOCUMENTS

| 5,774,873 | A | 6/1998 | Berent et al. |
| 5,940,816 | A * | 8/1999 | Fuhrer ................ G06N 99/005 706/13 |
| 6,006,201 | A | 12/1999 | Berent et al. |
| 7,660,758 | B2 | 2/2010 | Kwan |
| 8,589,212 | B2 | 11/2013 | Pollak et al. |
| 8,818,881 | B2 | 8/2014 | Himmerick et al. |
| 2006/0178973 | A1 | 8/2006 | Chiovari et al. |
| 2006/0242089 | A1 | 10/2006 | Vahidi |
| 2007/0185777 | A1 | 8/2007 | Pyle et al. |
| 2009/0006118 | A1 | 1/2009 | Pollak |

(Continued)

OTHER PUBLICATIONS

Office Action for U.S. Appl. No. 14/137,194, mailed Aug. 14, 2014, 17 pgs.

(Continued)

*Primary Examiner* — Thien M Le
(74) *Attorney, Agent, or Firm* — Sprinkle IP Law Group (57) ABSTRACT

Systems and methods for assisting a vehicle owner in making decisions regarding when to replace a vehicle by determining a vehicle owner's satisfaction with the vehicle relative to the cost of owning the vehicle. In one embodiment, a system is configured to provide a model for owner satisfaction which is based on historical vehicle replacement information, but is tailored to a particular owner according to user input. An owner satisfaction curve is produced from this model and is compared to a cost-of-ownership curve that is tailored to the vehicle and possibly also the user. The owner satisfaction curve is compared to the cost-of-ownership curve to enable the user to determine where the cost of ownership exceeds the owner's satisfaction, and the vehicle should be replaced.

21 Claims, 6 Drawing Sheets

(56) References Cited

U.S. PATENT DOCUMENTS

| | | |
|---|---|---|
| 2010/0088158 A1 | 4/2010 | Pollak |
| 2010/0179704 A1* | 7/2010 | Ozog ............... G06Q 10/06315 700/291 |
| 2010/0274571 A1 | 10/2010 | McFall et al. |
| 2010/0274631 A1 | 10/2010 | McFall et al. |
| 2010/0299190 A1* | 11/2010 | Pratt ...................... G06Q 30/02 705/14.4 |
| 2011/0082759 A1* | 4/2011 | Swinson ................ G06Q 30/02 705/26.1 |
| 2011/0119231 A1* | 5/2011 | Namburu ............... G06Q 10/06 707/609 |
| 2011/0202471 A1 | 8/2011 | Scott et al. |
| 2011/0231028 A1* | 9/2011 | Ozog .................... G06Q 10/06 700/291 |
| 2012/0136802 A1 | 5/2012 | McQuade |
| 2012/0233014 A1 | 9/2012 | Banks et al. |
| 2012/0284087 A1 | 11/2012 | Pollak |
| 2012/0284113 A1 | 11/2012 | Pollak |
| 2013/0066667 A1* | 3/2013 | Gulec .................. G06Q 10/087 705/7.13 |
| 2013/0218724 A1 | 8/2013 | Moretti et al. |
| 2014/0052328 A1 | 2/2014 | Nguyen et al. |
| 2014/0089208 A1 | 3/2014 | Humble et al. |
| 2014/0229391 A1 | 8/2014 | East, III et al. |
| 2014/0257934 A1 | 9/2014 | Chrzan et al. |
| 2014/0258044 A1 | 9/2014 | Chrzan et al. |
| 2014/0279020 A1 | 9/2014 | Duguid et al. |
| 2014/0279229 A1 | 9/2014 | Burgiss et al. |
| 2014/0279258 A1 | 9/2014 | Swinson et al. |
| 2014/0279709 A1 | 9/2014 | Lander et al. |
| 2015/0058152 A1 | 2/2015 | Pollak et al. |
| 2015/0206206 A1 | 7/2015 | Puente et al. |
| 2015/0324737 A1 | 11/2015 | Chrzan et al. |
| 2015/0324879 A1 | 11/2015 | Lu et al. |

OTHER PUBLICATIONS

True Cost to Own (TCO), Calculator on Edmunds.com (recovered from Internet Archive Feb. 14, 2012), <http://www.edmunds.com/tco.html>, 4 pgs.

Office Action for U.S. Appl. No. 14/137,194, mailed Feb. 24, 2015, 19 pgs.

Office Action for U.S. Appl. No. 14/137,194, mailed Dec. 9, 2015, 13 pgs.

Office Action for U.S. Appl. No. 14/137,194, mailed Apr. 15, 2016, 13 pgs.

Office Action for U.S. Appl. No. 14/137,228, mailed Aug. 15, 2016, 9 pgs.

Final Office Action issued for U.S. Appl. No. 14/137,228, dated Dec. 19, 2016, 11 pages.

Notice of Allowance issued for U.S. Appl. No. 14/137,194, dated Mar. 16, 2017, 6 pages.

Notice of Allowance issued for U.S. Appl. No. 14/137,228, dated Mar. 27, 2017 6 pages.

Notice of Allowance issued for U.S. Appl. No. 14/137,194, dated Jun. 19, 2017, 7 pages.

* cited by examiner

SYSTEMS AND METHODS FOR DETERMINING THE TIME TO BUY OR SELL A VEHICLE

CROSS-REFERENCE TO RELATED APPLICATION(S)

This application is a conversion of and claims a benefit of priority from U.S. Provisional Application No. 61/780,749, filed Mar. 13, 2013, entitled "SYSTEM AND METHOD FOR DETERMINING TIME TO BUY/SELL," which is incorporated by reference, with all appendices and attachments thereto, as if set forth herein in its entirety.

BACKGROUND

Field of the Invention

The invention relates generally to cost analysis and more particularly to systems, methods and computer program products for determining user satisfaction in relation to the cost of ownership of a vehicle in order to facilitate the user's decision regarding when to buy or sell the vehicle.

Related Art

Consumers are periodically faced with the prospect of making decisions with respect to high-value items such as vehicles, and it is often the case that the consumers are not well equipped to make these decisions. For example, when considering whether to purchase a vehicle, a consumer may be well aware of the list price of the vehicle, but it may be much less clear what the consumer's overall cost of owning the vehicle will be. This overall cost of ownership includes items such as fuel costs, insurance costs, financing costs, repair costs, and so on. Consumers may therefore have to rely on their intuition or "hunches" in making decisions about vehicle ownership.

When a vehicle is initially purchased, the consumer's satisfaction with the vehicle is typically at its highest point, and the equivalent value of this satisfaction is greater than the cost of ownership of the vehicle. After the initial purchase, the consumer's satisfaction with the vehicle gradually drops. This may result from a number of factors, such as typical wear and tear on the vehicle, increased maintenance and repair costs, lack of features that are found in later model vehicles, and so on. At some point, the consumer's satisfaction with the vehicle will drop to a level at which its equivalent value is less than the cost of ownership of the vehicle. At this point, the consumer wishes to buy a new vehicle.

This process is, for most consumers, an intuitive one. The consumer typically does not attempt to quantify the annual cost of ownership of the vehicle, and almost certainly does not attempt to quantify his or her satisfaction with the vehicle. This type of information would, however, be helpful to many consumers when making decisions regarding whether to buy or sell a vehicle, so that they could base their decisions upon more objective information than intuition, "hunches", or anecdotal information.

It would therefore be desirable to provide tools that enable vehicle owners (or potential owners) to quantify satisfaction and costs of ownership, and view their anticipated satisfaction in relation to the ownership costs in order to facilitate their decisions relating to the purchase or sale of a vehicle.

SUMMARY OF THE INVENTION

This disclosure is directed to systems and methods for determining a vehicle owner's satisfaction with the vehicle relative to the cost of owning the vehicle and thereby assisting the vehicle owner in making decisions as to when he or she should replace the vehicle. In one particular embodiment, a system includes a computer processor, a data storage device and an output device. The system is configured to generate an output that indicates a vehicle owner's satisfaction relative to the cost of ownership of the vehicle, and to display the output to a user via the output device. The system determines the cost of ownership for the specified vehicle over time, for example, by computing individual cost components such as depreciation, fuel costs and maintenance costs, and summing these components. The system determines an owner satisfaction curve for the specified vehicle and owner, which may be expressed as a dollar value over time. The output produced by the system may be in graphical form, such as overlaid satisfaction and cost of ownership curves, net utility curves, adjusted cost of ownership curves, and the like. The output may also be provided in numerical form, such as tabulated costs, satisfaction values, etc., or estimates of the time at which the owner's satisfaction drops below the cost of ownership of the vehicle.

The system may generate the owner satisfaction model in a variety of ways. In one embodiment, it is derived from historical data for sales of vehicles. This data can be obtained, for example, through the use of surveys directed to owners who have replaced their vehicles. The sales transactions embodied in the data are examined to determine the amount of time each vehicle was owned before it was sold (the time-to-sale), and to identify characteristics or parameters that are associated with the owner or the vehicle, and that may affect the time-to-sale. The relevant information identified in the historical information is then used to build a model in which, given a set of values for the characteristics of an owner and his or her vehicle, the owner's satisfaction with the vehicle over time, as well as the time-to-sale for that owner and vehicle, can be estimated. The development of the owner satisfaction model can include the classification of owners into groups based on their characteristics and the characteristics of their vehicles, and different models or sets of configuration parameters may be associated with each class. Consequently, when a particular user is identified as being associated with one of these classes, the model or parameters associated with that class can be retrieved and used to generate an owner satisfaction curve for the user.

An alternative embodiment comprises a method for determining a vehicle owner's satisfaction with a vehicle relative to the cost of owning the vehicle, allowing the vehicle owner to more informed decisions regarding when to replace the vehicle. The method may be implemented, for example, in a vehicle data system that is communicatively coupled to one or more client devices. In this embodiment, the method begins with determining an owner satisfaction curve for a specified vehicle and a specified owner. The satisfaction curve identifies values for the owner's satisfaction with the vehicle as a function of time. A cost of ownership curve for the vehicle is also determined. The cost of ownership may be determined, for example, by computing several component costs, such as depreciation, fuel, maintenance and repairs, taxes and fees, and so on. An output is then generated to indicate the owner's satisfaction relative to the cost of ownership over time. The output may be in graphical form, such as overlaid satisfaction and cost of ownership curves, net utility curves, adjusted cost of ownership curves, and the like. The output may also be provided in any suitable form, such as tabulated costs, satisfaction values, time-to-sale, cost of ownership and satisfaction curves, net utility curves, and the like. The owner satisfaction model can be generated in any suitable fashion, such as by surveying owners who have replaced their vehicles and deriving the relationship between time-to-sale and various owner/vehicle characteristics from the survey data. Then, a user can provide input defining the characteristics associated with a particular owner and vehicle, and a satisfaction curve can be generated based on this input and its correlation to the owner/vehicle characteristics and resulting times-to-sale identified in the survey information.

Another alternative embodiment comprises a computer program product. The computer program product consists of a set of computer instructions that are stored on a non-transitory computer-readable storage medium. The instructions are translatable by a processor to perform a method substantially as set forth above. Numerous other embodiments are also possible.

The various embodiments of the invention provide a framework to assist consumers in making decisions about their vehicles. More specifically, embodiments provides new ways to when to buy or sell a vehicle, based on a level of satisfaction with the vehicle in relation to the cost of owning the vehicle.

The above embodiments and others will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk), hardware circuitry or the like, or any combination.

As noted above, consumers often rely on their intuition or subjective sense of when it is time to sell their vehicles and replace them with new ones. While the costs of vehicle ownership (COVO) of a vehicle generally decrease over time, which makes the vehicle more attractive to the owner, other factors make the less attractive. The vehicle loses its "new" appearance, suffers normal wear and tear, has less desirable features than newer vehicles, and so on. At some point, the owner's satisfaction with the vehicle drops below the perceived value of the vehicle, and the owner decides to replace the vehicle with a newer one that will give him or her a higher level of satisfaction.

The present systems and methods provide a means to quantify the owner's level of satisfaction with a vehicle, as well as the costs of owning the vehicle. These measures are displayed in relation to each other in order to allow a user to visualize them as functions of time. This provides the user with a tool that allows the user to better understand the relationship between satisfaction and ownership costs, and to facilitate decisions as to when a vehicle should be replaced.

Figure 1:
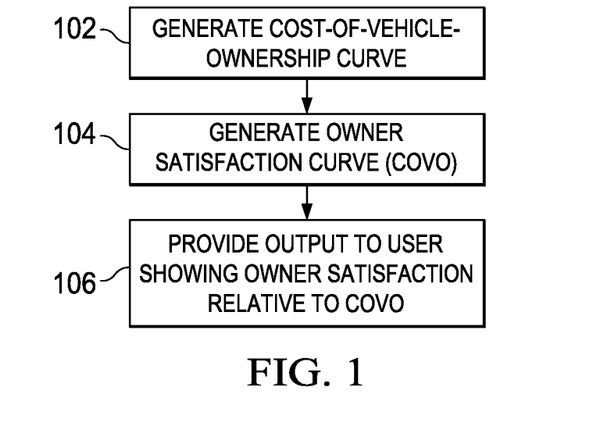
FIG. 1 is a flow diagram illustrating an exemplary method for assisting a vehicle owner in making a decision regarding when to sell a vehicle according to one embodiment.

Referring to FIG. 1, a flow diagram illustrating an exemplary method for assisting a vehicle owner in making a decision regarding when to sell a vehicle is shown. In this embodiment, a vehicle data system generates a cost-of-ownership curve for a particular vehicle (102). The cost of ownership may be determined in a variety of ways, but one exemplary methodology is discussed in more detail below. The vehicle data system also generates an owner satisfaction curve that is representative of the owner's satisfaction with the vehicle of interest (104). In one embodiment, the owner satisfaction curve is initially based on a set of default parameters for a generic owner, but is adjusted to tailor the curve to the particular owner of the vehicle of interest in response to receiving information about the owner. The vehicle data system then generates a graphical representation of the owner satisfaction curve in relation to the cost of ownership of the vehicle (106), so that the owner can see where the owner satisfaction curve drops below the cost of ownership curve, which indicates that the owner should replace the vehicle.

It should be noted that the term "curve" is used herein to refer to any set of values as a function of time, and should not be narrowly construed to include only graphical representations of this information. Curves may include lines graphs, bar graphs, non-graphical data sets (e.g., tables of data), etc. Time-based data sets (curves) used by the systems and methods herein may include, for example, cost of ownership versus time, satisfaction versus time, dissatisfaction versus time, net utility versus time, and others. Time may be measured in years, months, days, or other increments. Time may be measured from a date of purchase, a current date, or any other appropriate point in time.

Figure 2A:
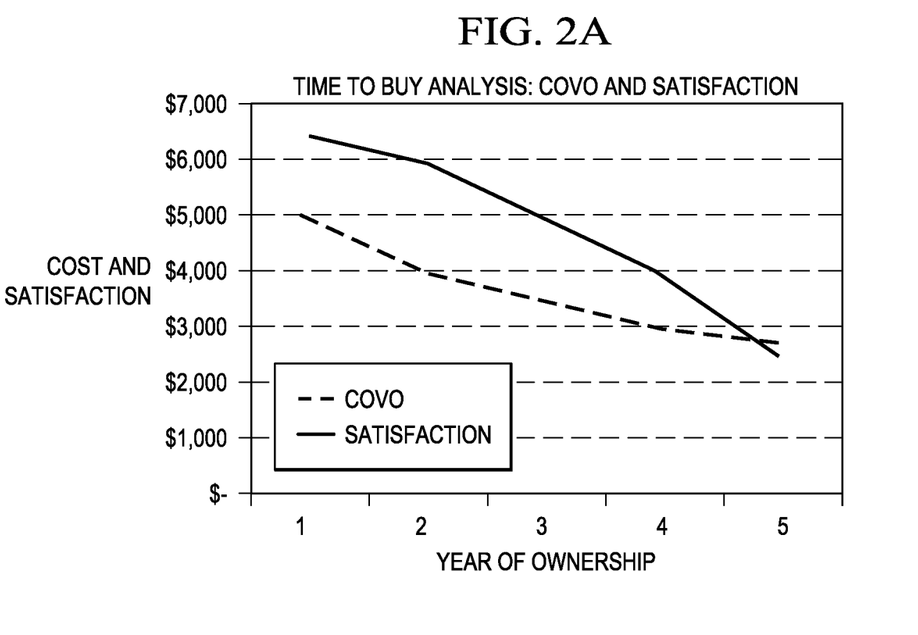
FIGS. 2A-2D are diagrams illustrating exemplary graphical outputs that may be provided to users in various embodiments.

Referring to FIG. 2A, a diagram illustrating an exemplary graphical output that is provided to a user in one embodiment is shown. In this figure, two curves (210, 220) are shown. Curve 210 is a line graph of owner satisfaction. Curve 220 is a line graph of an estimated cost of ownership of a vehicle. At year 1, the cost of ownership is estimated to be approximately $5000. The cost of ownership drops to about $4000 at year 2, $3750 at year 3, $3000 a year 4, and $2750 at year 5. The owner satisfaction curve begins at about $6500 at year 1, then drops to $6000 at year 2, $5000 at year 3, $4000 a year 4, and $2500 at year 5.

While the owner satisfaction curve may not be entirely objective, it is preferably derived from data obtained from actual data associated with owners who have replaced their vehicles, as will be discussed in more detail below. When an owner first purchases a vehicle, the owner satisfaction with vehicle clearly exceeds its ownership cost. Otherwise, the owner presumably would not have purchased the vehicle. At some point thereafter, the owner replaces the vehicle, indicating that the level (value) of satisfaction with the vehicle no longer exceeds the cost of owning the vehicle. Between these two points, the actual shape of the owner satisfaction curve may not be of particular importance. Therefore, although the satisfaction curve shown in FIG. 2A does not decrease linearly, it may be convenient in some embodiments to use a linear representation of the curve.

Figure 2B:
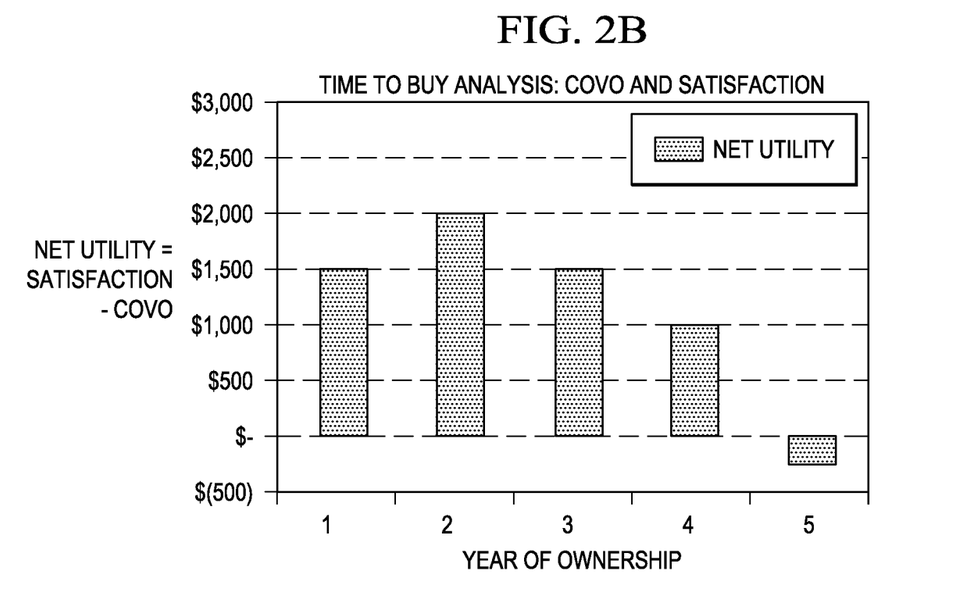

Referring now to FIG. 2B, a diagram illustrating a net utility curve is shown. The net utility shown in this figure is the difference between the owner satisfaction values and cost of ownership values shown in FIG. 2A. It can be seen that the net utility is approximately $1500 at year 1, increasing to $2000 in year 2, and then decreasing to $1500 in year 3, 1000 in year 4, and finally −$250 in year 5. The net utility therefore reflects the benefit of retaining the vehicle. While the net utility remains positive, the owner satisfaction is greater than the cost of ownership, and the owner should hold onto the vehicle. When the net utility becomes negative, the owner no longer gets enough satisfaction from the vehicle to justify the cost of owning the vehicle, so it should be replaced.

The relationship between an owner's satisfaction with a vehicle and the cost of ownership of the vehicle may be expressed (and visualized) in other ways as well. Because it is desired to determine when the owner's satisfaction has dropped below the cost of owning the vehicle, it may make sense to consider the owner's dissatisfaction with the vehicle, rather than his satisfaction. The owner's dissatisfaction may be given a value that is treated as a cost that is combined with the other cost of ownership components (e.g., fuel, maintenance, etc.) to arrive at an adjusted ownership cost. Because the owner's dissatisfaction (and the associated value) increases over time, the adjusted cost of ownership for the vehicle will initially decrease, but will reach a minimum and then start to increase, as shown in the bar graph of FIG. 2C. The minimum value of the adjusted cost of ownership curve corresponds to the point at which the satisfaction and cost-of-ownership curves in FIG. 2A cross, and where the Net Utility curve of FIG. 2B crosses from positive to negative. This is the time at which the owner should replace the vehicle.

Figure 2C:
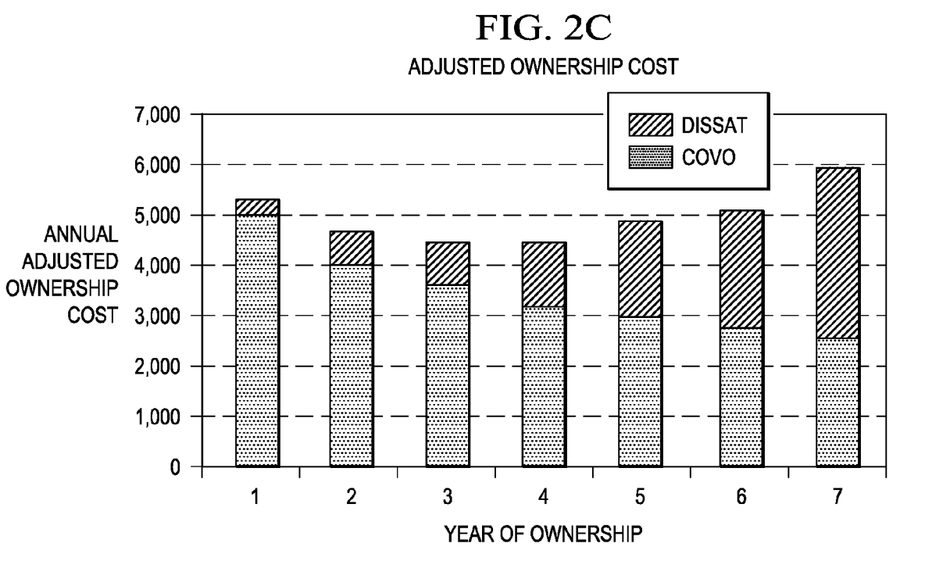
Figure 2D:
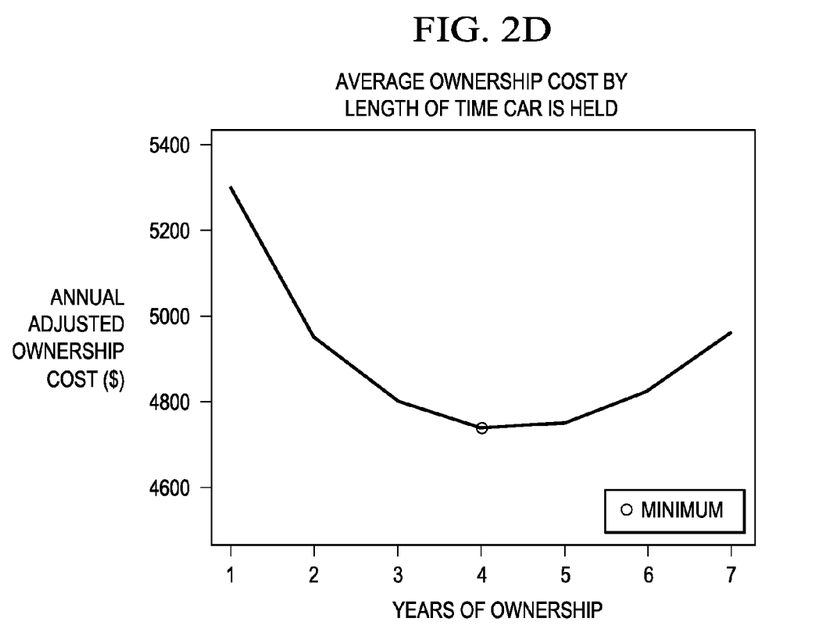

The bar graph of FIG. 2C is a cumulative graph—the bar corresponding to each year includes separate cost of ownership (COVO) and dissatisfaction values. This type of graph is provided to underscore the effect of the dissatisfaction values on the adjusted cost of ownership. Even though the objective cost of ownership values monotonically decrease over time, the decrease becomes smaller, while the dissatisfaction values grow more rapidly, causing the adjusted cost of ownership to increase after the dip. Alternative embodiments may not visually separate the COVO and dissatisfaction components, but may simply indicate the total adjusted cost of ownership, e.g., as shown in FIG. 2D. Alternatively, the system may use any of the above curves to derive more streamlined values, such as an estimated time (or range of times) to replacement of a vehicle (the time at which the adjusted cost of ownership is minimized).

Figure 3:
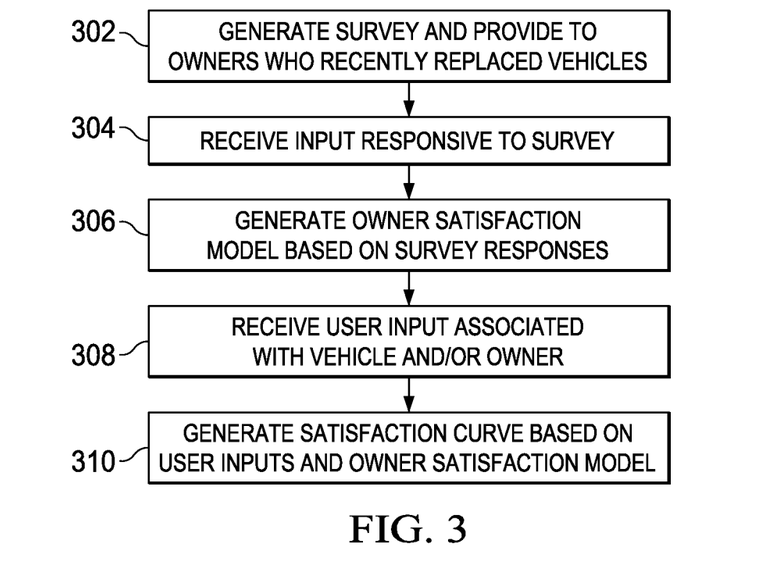
FIG. 3 is a flow diagram illustrating an exemplary method for determining a satisfaction curve according to one embodiment.

In general, around years 3-7, owners will find that their net utility becomes negative (as seen in FIG. 2B). Different owners will have different levels of satisfaction for a particular vehicle, so that each owner's net utility becomes negative at a different time. The satisfaction curve for each owner may therefore be tailored to more accurately represent that owner. Referring to FIG. 3, a flow diagram illustrating an exemplary method for determining a satisfaction curve in one embodiment is shown.

Although the satisfaction curve for an individual owner is particular to that owner, it can be estimated based on the individual owner's characteristics, and the way those characteristics relate to other users whose satisfaction has been empirically determined (by their actions in replacing their vehicles). In the embodiment of FIG. 3, a survey is initially provided to a group of owners who have already replaced their vehicles (302). For each of these owners, the time from the purchase of their respective vehicles to the time those vehicles were replaced (the time at which net utility is negative) is known. The survey is designed to elicit information associated with each of the owners that can be correlated to the known interval between purchase and replacement of their respective vehicles.

The survey to the owners may include many different questions, and may allow the owners to provide information in a variety of ways. For example, the survey may include questions (and possible answers) such as:
1. What is your income level?
2. What was your income level when you bought the car you replaced?
3. My income level in the next couple years is: A) Likely to be lower or remain the same, B) Likely to increase modestly, C) Likely to rise substantially, D) Is highly uncertain whether it will be higher or lower.
4. The car I drive sends an important signal to others about who I am. 1. Strongly Agree . . . 5. Strongly Disagree
5. I bought a car with A) standard features, B) a few options, C) loaded with optional equipment.
6. I replaced my last vehicle mostly because: A) I wanted a better vehicle or one with newer features; B) My last vehicle was unreliable; C) I worried that my last vehicle would become unreliable; D) My last vehicle no longer met my needs; 5) other.
7. My life circumstances are likely to change in the next few years requiring me to replace my current car? 1. Strongly Agree . . . 5. Strongly Disagree 8. I like having the newest possible products? 1. Strongly Agree . . . 5. Strongly Disagree 9. I am attached to my personal belongings and am saddened to sell my old car. 1. Strongly Agree . . . 5. Strongly Disagree 10. Features like safety, energy efficiency, engine and styling, integration of Internet are highly appealing. 1. Strongly Agree . . . 5. Strongly Disagree 11. Saving money is a strong consideration in my car purchases. 1. Strongly Agree . . . . 5. Strongly Disagree 12. I plan to keep my next car for: A) 2 or less years; B) 2-4 years; C) 5-6 years; D) 7 or more years; E) until absolutely necessary to replace.

When the survey information is received from the owners (304), it is processed by the vehicle data system to correlate the owners' answers to their intervals of ownership of their vehicles. Based on the correlated data, a predictive owner satisfaction model is generated (306). When a particular owner uses the system to determine whether to replace a vehicle, the owner provides input that identifies one or more characteristics of the vehicle and/or owner (308), and this input is model is used in conjunction with the owner satisfaction model to generate a satisfaction curve for that particular owner (310). The satisfaction curve can be displayed graphically with the cost of ownership, it can be used to generate a net utility curve, it can be used to generate a dissatisfaction curve that can be added to the cost of ownership, or it can be used in some other manner.

The model may initially incorporate default values that are generic to the surveyed group of owners. When the particular owner provides relevant inputs to the system, the satisfaction model can be updated to reflect these inputs and more accurately indicate the particular owner's satisfaction with his or her vehicle. Vehicle owners who use the system, and for whom predicted satisfaction curves are generated, can then provide information regarding their eventual sales of their vehicles so that the model can be verified and/or updated by the system based on this additional information.

As noted above, the satisfaction model (and the satisfaction curves for each user) may take various forms, which may range from complex curves to linear graphs.

In this disclosure, COVO[t] refers to the cumulative cost of vehicle ownership from purchase to t. A vehicle owner's satisfaction with the vehicle can be greater than the incremental cost of ownership (COVO) before replacement of the vehicle, and less than the incremental cost of ownership after replacement of the vehicle. This relationship can be expressed as follows:

Satisfaction>incremental COVO for all years prior to the replacement date.
Satisfaction<COVO for the next year.

Thus, incremental COVO—(C(t+1)−C(t))—can be relevant to the owner's decision to replace the vehicle at time t.

With this in mind, it may be necessary to make some assumptions to construct a satisfaction curve relative to COVO for an owner of a particular vehicle. Replacing or not replacing the vehicle only indicates that there is an inequality between COVO and satisfaction, but does not indicate the magnitude. Thus, the exact time at which the crossover occurs between the satisfaction and incremental COVO curves is heretofore unknown.

To this end, one approach is to represent satisfaction with a downward curve which is higher than COVO at all points prior to replacement, and has a maximum ratio of satisfaction-to-incremental COVO of 1+x. Here, the ratio "x" represents the value in terms of percentage that results in a wedge between satisfaction and incremental COVO.

Accordingly, creating a satisfaction curve may begin with identifying the date on which the vehicle is replaced, as known from a buyer's previous behavior. Points that can be used to generate the satisfaction curve may include:
 1) Satisfaction=(1+x)*incremental COVO; and
 2) Satisfaction≤incremental COVO at the time replacement of the vehicle occurs.

If the maximum ratio of satisfaction to incremental COVO occurs at year 1, and replacement occurs at year R, then the net utility at year 1 is defined by:

Net Utility$[t=1]=x[t=1]*$(incremental COVO$[t=1]$)

While satisfaction is not linear, the ratio x can be. For example, in one embodiment, the satisfaction curve may take the form S[t]=(COVO[t]−COVO[t−1])×(1+x[t]), where satisfaction=S, time=t, and x[t] monotonically decreases in t.

In one embodiment, the satisfaction curve may take the form S[t]=(incremental COVO[t])*(1+x[t]), where x[t]=x[t=0]−m×t. The slope (m) of the function x[t] can be determined:

$m=x[0]/R$

The y-intercept of the function x[t], b, can then be determined:

$b=x[0]$

The satisfaction curve can then be determined:

$$\text{Satisfaction}[t] = (\text{incremental } COVO[t]) \times (1 + x[t])$$
$$= (\text{incremental } COVO[t]) * (1 + x[0]) * (1 - (1/R) * t)$$

Note at $t = R$,
$$\text{Satisfaction}[R] =$$
Incremental $COVO[R]$ and hence Net Satisfaction = 0.

Following is an example in which an owner's satisfaction and net utility for a vehicle are determined. In this example, the owner's expected satisfaction with a vehicle for year t, S(t), can be expressed as follows:

$S(t)=(C(t)-C(t-1))\times(1+x(t))$, where C(t) is the cumulative cost of vehicle ownership for year t, and x(t) is the net utility of the vehicle to the owner for year t.

In year 1, all costs incurred are counted in year 1, so C(0)=0. Then, S(1)=c(1)+x(1). Since the owner purchased the vehicle (or assuming the potential owner will purchase the vehicle), it can be assumed that the net utility (the amount by which satisfaction exceeds incremental cost of ownership) is positive (i.e., x(1)>0). If this were not the case, it would be irrational for the consumer to buy the vehicle.

Satisfaction decreases with t, and, as explained above, can be assumed to decrease as a percentage of incremental COVO, C(t), so x(t)=x(0)−m×t, where m>0. The net satisfaction (net utility) for year t is equal to S(t)−(C(t)−C(t−1)). In other words, expected net satisfaction for year t is the expected satisfaction during that year, less incremental COVO over that same year.

Thus, net satisfaction for year $t = (C(t) - C(t-1)) \times (1 + x(t)) - (C(t) - C(t-1))$
$= (C(t) - C(t-1)) \times (t)$
$= (C(t) - C(t-1))(x(0) - m \times t)$, where
$(C(t) - C(t-1)) >$
0 for all $t$ (because there is always some cost of ownership)

When net satisfaction x(t) becomes negative (m×t>x(0)), the consumer expects that keeping the vehicle would provide a level of satisfaction that is less than the incremental cost of the vehicle. At this point, it is rational for the car owner to replace his car. It should be noted that the fact that net satisfaction becomes negative does not imply that overall satisfaction is negative—it simply implies that satisfaction is less than the costs that are expected to be incurred.

The net satisfaction function for a particular owner may be tailored to that owner based on various characteristics associated with that owner. These characteristics may be identified and used to adjust parameters of the net satisfaction function. The owner's characteristics may be identified from the owner's answers to demographic and other informational questions. Below are two exemplary questions and corresponding answers.
1. My relationship status is likely to? E) change from single to married/committed
2. The principle reason for replacing my last car was? C) Better model Obtaining answers to the questions and then correlating the results with variables of the net satisfaction function which reflect these values allows the function to more closely match the behavior of the particular owner. The answers to the exemplary questions above suggest that the owner will hold onto a vehicle for a relatively short duration.

The parameters of the net satisfaction curve may be adjusted in various ways. A regression methodology is one approach. Consider the following model:

Replacement Year=Intercept+$B1$×Dummy_Relationship+$B2$×Dummy_BetterModel+ . . . .

Suppose the regression results are: Intercept=5; B1=−0.5; B2=−0.75. Then owner's predicted replacement year is: 5+(−0.5)×1+(−0.75)×1=3.75. The value of m in the satisfaction equation is then set so that: x(0)−m×3.75=0; or m=x(0)/3.75, where x(0) is the percent instantaneous satisfaction above cost at the onset of ownership. x(0) is not known, but is set according to intuition. Suppose x(0)=0.75. What x(0)=0.75 means is that the owner's satisfaction is greater than the immediate COVO (driving off the lot). In particular, satisfaction equals this immediate COVO+75%. Then m=0.75/3.75=0.2.

Accordingly, a vehicle with COVO per year starting at year 1 are at $4,000; $3,000; $2,500; $2,000; $1,750; the Satisfaction and Net Satisfaction values can be calculated as shown in Table 1 below.

TABLE 1

| | COVO | $x_t$ | Satisfaction | Net Satisfaction |
|---|---|---|---|---|
| t = 1 | $4,000 | .55 | $6,200 | $2,200 |
| t = 2 | $3,000 | .35 | $4,050 | $1,050 |
| t = 3 | $2,500 | .15 | $2,875 | $375 |

TABLE 1-continued

| | COVO | $x_t$ | Satisfaction | Net Satisfaction |
|---|---|---|---|---|
| t = 4 | $2,000 | −.05 | $1,900 | ($100) |
| t = 5 | $1,750 | −.25 | $1,313 | ($438) |

Take Net Satisfaction for t=2 as an example:

$X(2)=0.75-0.2\times2=0.35$

Figure 6:
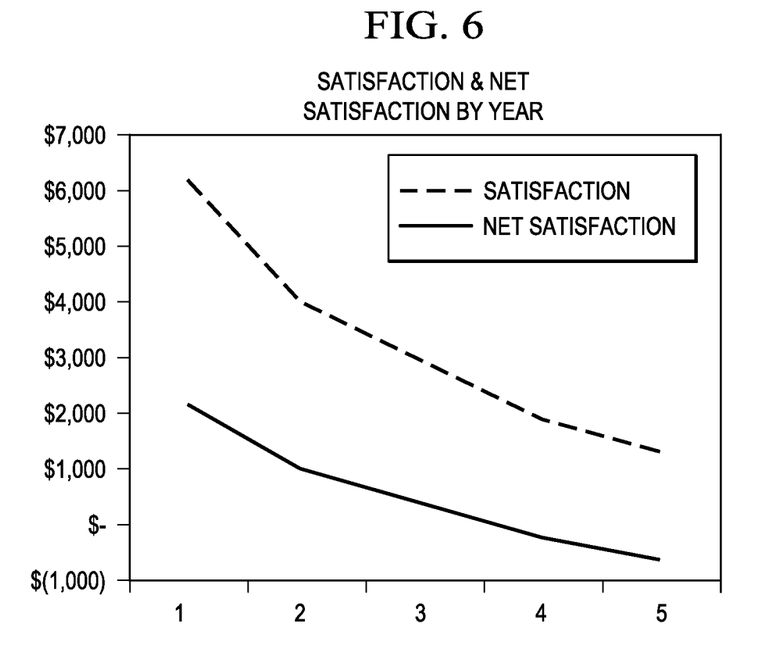
FIG. 6 is a diagram illustrating an exemplary relationship between satisfaction and net satisfaction relative to time according to one embodiment.

So, the Satisfaction value at t=2 is $3,000×(1+0.35)=$4,050 and the Net Satisfaction value at t=2 is $4,050−$3,000=$1,050. An example of this relationship is illustrated in FIG. 6.

As noted above, the satisfaction curve will be different for different individuals. In one embodiment, the slope and intercept of the linear x[t] curve can be computed separately for different groups or classes of owners. These classes of owners will each have associated characteristics that are used to identify owners that fall within the respective classes. Accordingly, when a particular user/owner uses the system, he or she can provide input that allows the system to classify him or her into one of the previously identified groups. The system can then retrieve the computed slope and intercept for the class associated with the user/owner. The system can then generate a satisfaction curve for the user/owner based on the retrieved slope and intercept.

Since it is desired to present the owner satisfaction curve in relation to the cost of ownership of the owner's vehicle, the cost of ownership must be computed as well. This may be done in various ways, but an exemplary methodology is described in U.S. patent application Ser. No. 14/137,194, filed Dec. 20, 2013, entitled "SYSTEMS AND METHODS FOR DETERMINING COST OF VEHICLE OWNERSHIP," which is incorporated by reference as if set forth herein in its entirety. This exemplary methodology is illustrated in FIG. 4.

Figure 4:
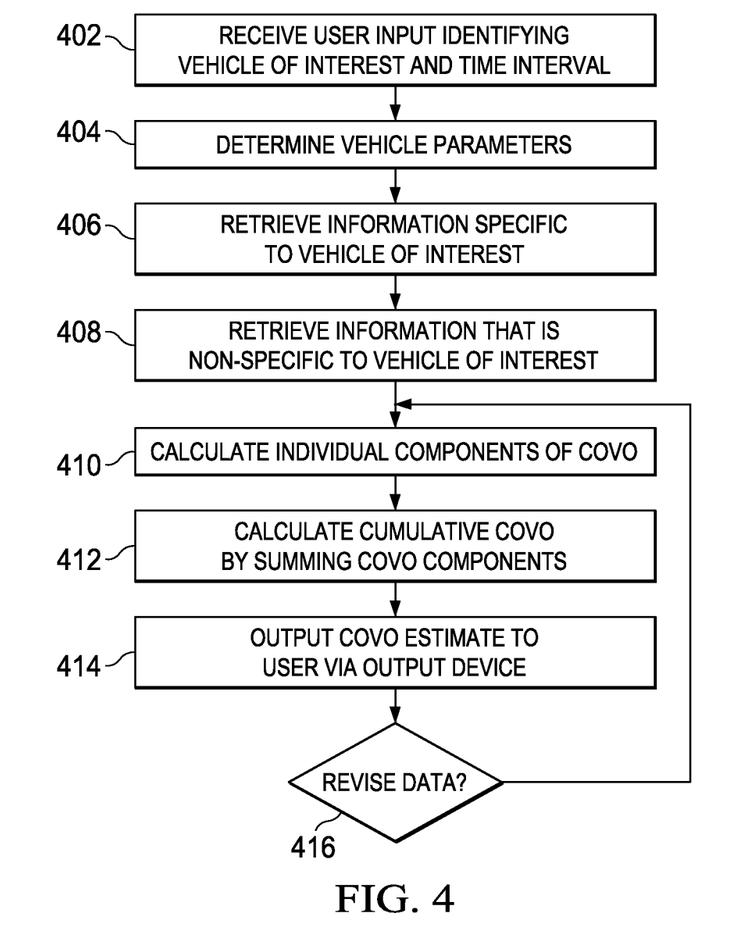
FIG. 4 is a flow diagram illustrating a method for determining the cost of vehicle ownership according to one embodiment.

Referring to FIG. 4, a flow diagram illustrating a method for determining the cost of vehicle ownership (COVO) is shown. The method begins with receipt of user input that identifies a vehicle of interest, as well as a time interval of interest (402). The vehicle of interest may be identified in variety of ways, such as providing the make, model and year for the vehicle. The user may provide additional detail (e.g., vehicle identification number, vehicle condition, option packages, etc.) that enables the system to make a more accurate determination of the vehicle's value and associated costs. The user may select any desired interval for computation of COVO and satisfaction curves.

Based on the input received from the user, various parameters of the vehicle are determined (404), and based on the identified parameters for the vehicle, the system retrieves and/or requests vehicle-specific information necessary for the COVO calculation (406), such as expected vehicle repairs/maintenance, vehicle repair costs, etc. The system may also retrieve various types of non-vehicle-specific information to be used in the COVO determination (408). Some of this information may be associated in varying degrees with the user (e.g., credit scores, insurance rates, etc.), while some of it may not be associated with the user at all (e.g., fuel prices, taxes, etc.)

When the system has obtained the necessary information various COVO component calculations are made (410). The components of COVO may include, for example, depreciation costs, financing costs, fuel costs, taxes and fees, insurance costs, and maintenance and repair costs. When the COVO components have been calculated, they can be summed to arrive at a total estimated COVO (412). In one embodiment, the estimated COVO is incrementally determined (i.e., broken down into costs associated with year 1, costs associated with year 2, and so on) so that it can be conveniently output to the owner in relation to the satisfaction curve (414).

Figure 5:
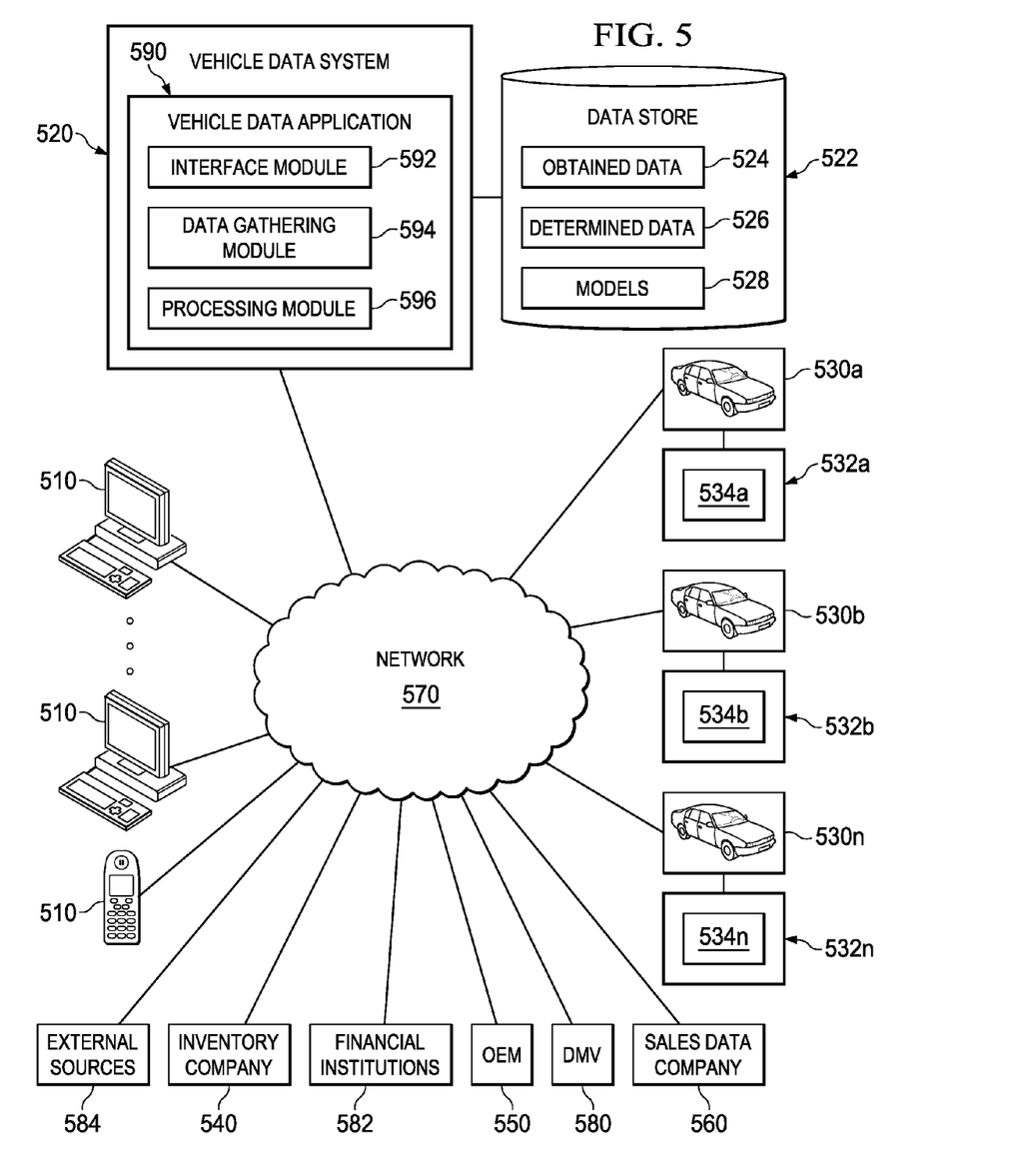
FIG. 5 is a diagram illustrating an exemplary topology which may be used to implement embodiments of the invention.

The present systems and methods may be implemented in various topologies. One exemplary topology is illustrated in FIG. 5. Referring to FIG. 5, topology 500 comprises a set of entities, including vehicle data system 520, which is coupled through network 570 to computing devices 510 (e.g., computer systems, personal data assistants, kiosks, dedicated terminals, mobile telephones, smart phones, etc.), and one or more computing devices at inventory companies 540, original equipment manufacturers (OEM) 550, sales data companies 560, financial institutions 582, external information sources 584, departments of motor vehicles (DMV) 580 and one or more associated point of sale locations, in this embodiment, car dealers 530. Computing devices 510 may be used by consumers while conducting a search for consumer goods and/or services, such as automobiles. Network 570 may be for example, a wireless or wired communication network such as the Internet or wide area network (WAN), publicly switched telephone network (PTSN) or any other type of electronic or non-electronic communication link such as mail, courier services or the like.

Vehicle data system 520 may comprise one or more computer systems with central processing units executing instructions embodied on one or more computer readable media where the instructions are configured to perform at least some of the functionality associated with embodiments disclosed herein. These applications may include a vehicle data application 590 comprising one or more applications (instructions embodied on one or more non-transitory computer readable media) configured to implement an interface module 592, data gathering module 594 and processing module 596 utilized by the vehicle data system 520. Furthermore, vehicle data system 520 may include data store 522 operable to store obtained data 524, data 526 determined during operation, models 528 which may comprise a set of dealer cost model or price ratio models, or any other type of data associated with embodiments disclosed herein or determined during the implementation of those embodiments.

Vehicle data system 520 may provide a wide degree of functionality, including utilizing one or more interfaces 592 configured to, for example, receive and respond to queries from users at computing devices 510; interface with inventory companies 540, manufacturers 550, sales data companies 560, financial institutions 582, DMVs 580 or dealers 530 to obtain data; or provide data obtained, or determined, by vehicle data system 520 to any of inventory companies 540, manufacturers 550, sales data companies 560, financial institutions 582, DMVs 580, external data sources 584 or dealers 530. It will be understood that the particular interface 592 utilized in a given context may depend on the functionality being implemented by vehicle data system 520, the type of network 570 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, or almost any other type of interface which it is desired to utilize in a particular context.

In general, then, using these interfaces 592 vehicle data system 520 may obtain data from a variety of sources, including one or more of inventory companies 540, manufacturers 550, sales data companies 560, financial institutions 582, DMVs 580, external data sources 584 or dealers 530 and store such data in data store 522. This data may be then grouped, analyzed or otherwise processed by vehicle data system 520 to determine desired data 526 or models 528 which are also stored in data store 522.

A user at computing device 510 may access the vehicle data system 520 through the provided interfaces 592 and specify certain parameters, such as information identifying a particular vehicle. The vehicle data system 520 can select a particular set of data in the data store 522 based on the user specified parameters, process the set of data using processing module 596 and models 528. Vehicle data system 520 can further generate interfaces to computing devices 510 using interface module 592, and can present data determined from the processing to the user at the user's computing device 510. The interfaces may visually present the selected data set to the user in a highly intuitive and useful manner.

A visual interface may present one or more portions of the selected data set as price curves, bar charts, histograms, etc. that reflect quantifiable prices, costs, values, etc. or ranges thereof relative to a particular owner and vehicle. Using these types of visual presentations may enable a user to better understand the relationship of owner satisfaction to more objective costs of ownership, and may thereby facilitate the user's decisions as to whether to replace a vehicle. Additionally, by presenting data corresponding to different vehicles or vehicle configurations in a substantially identical manner, a user can easily make comparisons between the different vehicles or vehicle configurations, and consequently be better informed regarding the amount of time he or she should hold onto the respective vehicles/configurations.

In some embodiments, users can change, isolate, and set limits with respect to the above-described components. If a user configurable parameter is not set, then a default setting or dynamically generated value may be used. For example, a user may provide a monthly mileage that is expected to be driven. If the user does not provide a monthly mileage, the system may use a default value of 12,000 miles per month. Other parameters can use similar default values if not overridden by user input.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such product, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

The benefits and advantages which may be provided by the invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for determining costs of vehicle ownership in relation to owner satisfaction, the system comprising:
   at least one processor; and
   at least one non-transitory computer-readable medium storing instructions translatable by the at least one processor to perform:
      receiving, from a client device communicatively connected to the system over a network, user input that identifies a user-specified vehicle and a time interval of interest;
      determining vehicle parameters of the user-specified vehicle;
      based on the vehicle parameters, retrieving or requesting cost information specific to the user-specified vehicle;
      determining a cost of ownership curve for the user-specified vehicle based at least in part on the cost information specific to the user-specified vehicle and incrementally relative to the time interval of interest, wherein the cost of ownership curve represents a set of values of the cost of ownership of the user-specified vehicle as a function of time;
      determining an owner satisfaction curve for the user-specified vehicle and a specified owner, wherein the owner satisfaction curve represents a set of values for the specified owner's satisfaction with the user-specified vehicle as a function of time; and
      generating an output for display on the client device, wherein the output comprises the set of values for the specified owner's satisfaction with the user-specified vehicle relative to the set of values of the cost of ownership of the user-specified vehicle per the time interval of interest such that where the owner satisfaction curve drops below the cost of ownership curve represents a quantified timing to replace the user-specified vehicle.

2. The system of claim 1, wherein the output comprises a graphical representation of the specified owner's satisfaction curve for the user-specified vehicle and a graphical representation of the cost of ownership curve for the user-specified vehicle as functions of time.

3. The system of claim 1, wherein the output comprises a graphical representation of a net utility of the user-specified vehicle for the specified user, wherein the net utility comprises a difference between the specified owner's satisfaction with the user-specified vehicle and the cost of ownership for the user-specified vehicle.

4. The system of claim 1, wherein the output comprises a graphical representation of an adjusted cost of ownership of the user-specified vehicle for the specified owner, wherein the adjusted cost of ownership comprises a sum of values of an objective cost of ownership curve and a dissatisfaction curve.

5. The system of claim 1, wherein the instructions are further translatable by the at least one processor to derive a user satisfaction model from a historical data set and store the user satisfaction model in a data storage device, wherein derivation of the user satisfaction model comprises, for each of a plurality of vehicle sale transactions:
   querying the historical data set for a time-to-sale of the user-specified vehicle and parameters associated with the user-specified vehicle and the specified owner; and
   correlating the parameters associated with the user-specified vehicle and the specified owner to the time-to-sale of the user-specified vehicle, wherein the user satisfaction model is configured based on the parameters associated with the user-specified vehicle and the specified owner.

6. The system of claim 5, wherein the instructions are further translatable by the at least one processor to determine the owner satisfaction curve for the user-specified vehicle and the specified owner by:
   receiving user input which specifies one or more parameters associated with the user-specified vehicle and the specified owner;
   using the one or more parameters associated with the user-specified vehicle and the specified owner to correlate the user-specified vehicle and the specified owner to one or more of the plurality of vehicle sale transactions; and
   using the correlation to generate the owner satisfaction curve.

7. The system of claim 5, wherein the instructions are further translatable by the at least one processor to:
   identify one or more classes of the plurality of vehicle sale transactions;
   for each of the one or more classes identified in the plurality of vehicle sale transactions, generate a set of satisfaction curve parameters;
   associate the user-specified vehicle and the specified owner with a class of the one or more classes;
   retrieve the set of satisfaction curve parameters of the class with which the user-specified vehicle and the specified owner are associated; and
   generate the owner satisfaction curve for the user-specified vehicle and the specified owner using the retrieved set of satisfaction curve parameters of the class with which the user-specified vehicle and the specified owner are associated.

8. A method for determining costs of vehicle ownership in relation to owner satisfaction in a vehicle data system, the method comprising:
   receiving, by the vehicle data system from a client device communicatively connected to the vehicle data system over a network, user input that identifies a user-specified vehicle and a time interval of interest, the vehicle data system embodied on at least one server machine each having at least one processor and non-transitory computer readable memory;
   determining, by the vehicle data system, vehicle parameters of the user-specified vehicle;
   based on the vehicle parameters, retrieving or requesting, by the vehicle data system, cost information specific to the user-specified vehicle;
   determining, by the vehicle data system, a cost of ownership curve for the user-specified vehicle based at least in part on the cost information specific to the user-specified vehicle and incrementally relative to the time interval of interest, wherein the cost of ownership curve represents a set of values of the cost of ownership of the user-specified vehicle as a function of time;
   determining, by the vehicle data system, an owner satisfaction curve for the user-specified vehicle and a specified owner, wherein the owner satisfaction curve represents a set of values for the specified owner's satisfaction with the user-specified vehicle as a function of time; and
   generating, by the vehicle data system, an output for display on the client device, wherein the output comprises the set of values for the specified owner's satisfaction with the user-specified vehicle relative to the set of values of the cost of ownership of the user-specified vehicle per the time interval of interest such that where the owner satisfaction curve drops below the cost of ownership curve represents a quantified timing to replace the user-specified vehicle.

9. The method of claim 8, wherein the output comprises a graphical representation of the specified owner's satisfaction curve for the user-specified vehicle and a graphical representation of the cost of ownership curve for the user-specified vehicle as functions of time.

10. The method of claim 8, wherein the output comprises a graphical representation of a net utility of the user-specified vehicle for the specified user, wherein the net utility comprises a difference between the specified owner's satisfaction with the user-specified vehicle and the cost of ownership for the user-specified vehicle.

11. The method of claim 8, wherein the output comprises a graphical representation of an adjusted cost of ownership of the user-specified vehicle for the specified owner, wherein the adjusted cost of ownership comprises a sum of values of an objective cost of ownership curve and a dissatisfaction curve.

12. The method of claim 8, further comprising deriving a user satisfaction model from a historical data set and storing the user satisfaction model in a data storage device, wherein the deriving comprises, for each of a plurality of vehicle sale transactions:
   querying the historical data set for a time-to-sale of the user-specified vehicle and parameters associated with the user-specified vehicle and the specified owner; and
   correlating the parameters associated with the user-specified vehicle and the specified owner to the time-to-sale of the user-specified vehicle, wherein the user satisfaction model is configured based on the parameters associated with the user-specified vehicle and the specified owner.

13. The method of claim 12, wherein determining the owner satisfaction curve for the user-specified vehicle and the specified owner comprises:

receiving user input which specifies one or more parameters associated with the user-specified vehicle and the specified owner;

using the one or more parameters associated with the user-specified vehicle and the specified owner to correlate the user-specified vehicle and the specified owner to one or more of the plurality of vehicle sale transactions; and using the correlation to generate the owner satisfaction curve.

14. The method of claim 12, further comprising:

identifying one or more classes of the plurality of vehicle sale transactions;

for each of the one or more classes identified in the plurality of vehicle sale transactions, generating a set of satisfaction curve parameters;

associating the user-specified vehicle and the specified owner with a class of the plurality of classes;

retrieving the set of satisfaction curve parameters of the class with which the user-specified vehicle and the specified owner are associated; and generating the owner satisfaction curve for the user-specified vehicle and the specified owner using the retrieved set of satisfaction curve parameters of the class with which the user-specified vehicle and the specified owner are associated.

15. A computer program product for determining costs of vehicle ownership in relation to owner satisfaction in a vehicle data system, the computer program product comprising at least one non-transitory computer-readable storage medium storing computer instructions that are translatable by at least a processor of the vehicle data system to perform:

receiving, from a client device communicatively connected to the vehicle data system over a network, user input that identifies a user-specified vehicle and a time interval of interest;

determining vehicle parameters of the user-specified vehicle;

based on the vehicle parameters, retrieving or requesting cost information specific to the user-specified vehicle;

determining a cost of ownership curve for the user-specified vehicle based at least in part on the cost information specific to the user-specified vehicle and incrementally relative to the time interval of interest, wherein the cost of ownership curve represents a set of values of the cost of ownership of the user-specified vehicle as a function of time;

determining an owner satisfaction curve for the user-specified vehicle and a specified owner, wherein the owner satisfaction curve represents a set of values for the specified owner's satisfaction with the user-specified vehicle as a function of time; and generating an output for display on the client device, wherein the output comprises the set of values for the specified owner's satisfaction with the user-specified vehicle relative to the set of values of the cost of ownership of the user-specified vehicle per the time interval of interest such that where the owner satisfaction curve drops below the cost of ownership curve represents a quantified timing to replace the user-specified vehicle.

16. The computer program product of claim 15, wherein the output comprises a graphical representation of the specified owner's satisfaction curve for the user-specified vehicle and a graphical representation of the cost of ownership curve for the user-specified vehicle as functions of time.

17. The computer program product of claim 15, wherein the output comprises a graphical representation of a net utility of the user-specified vehicle for the specified user, wherein the net utility comprises a difference between the specified owner's satisfaction with the user-specified vehicle and the cost of ownership for the user-specified vehicle.

18. The computer program product of claim 15, wherein the output comprises a graphical representation of an adjusted cost of ownership of the user-specified vehicle for the specified owner, wherein the adjusted cost of ownership comprises a sum of values of an objective cost of ownership curve and a dissatisfaction curve.

19. The computer program product of claim 15, further comprising deriving a user satisfaction model from a historical data set and storing the user satisfaction model in a data storage device, wherein the deriving comprises, for each of a plurality of vehicle sale transactions:

querying the historical data set for a time-to-sale of the user-specified vehicle and parameters associated with the user-specified vehicle and the specified owner; and correlating the parameters associated with the user-specified vehicle and the specified owner are correlated to the time-to-sale of the user-specified vehicle, wherein the user satisfaction model is configured based on the parameters associated with the user-specified vehicle and the specified owner.

20. The computer program product of claim 19, wherein determining the owner satisfaction curve for the user-specified vehicle and the specified owner comprises:

receiving user input which specifies one or more parameters associated with the user-specified vehicle and the specified owner;

using the one or more parameters associated with the user-specified vehicle and the specified owner to correlate the user-specified vehicle and the specified owner to one or more of the plurality of vehicle sale transactions; and using the correlation to generate the owner satisfaction curve.

21. The computer program product of claim 19, further comprising:

identifying one or more classes of the plurality of vehicle sale transactions;

for each of the one or more classes identified in the plurality of vehicle sale transactions, generating a set of satisfaction curve parameters;

associating the user-specified vehicle and the specified owner with a class of the plurality of classes;

retrieving the set of satisfaction curve parameters of the class with which the user-specified vehicle and the specified owner are associated; and generating the owner satisfaction curve for the user-specified vehicle and the specified owner using the retrieved set of satisfaction curve parameters of the class with which the user-specified vehicle and the specified owner are associated.

* * * * *